United States Patent [19]

Rebordosa

[11] Patent Number: 4,850,699

[45] Date of Patent: Jul. 25, 1989

[54] HAND-HELD MIXING DEVICE

[75] Inventor: Antonio Rebordosa, Manresa, Spain

[73] Assignee: Braun Aktiengesellschaft, Kronberg, Fed. Rep. of Germany

[21] Appl. No.: 171,787

[22] Filed: Mar. 22, 1988

[30] Foreign Application Priority Data

Mar. 24, 1987 [DE] Fed. Rep. of Germany ....... 3709573

[51] Int. Cl.[4] ................................................ B01F 3/00
[52] U.S. Cl. .................................... 366/129; 366/279; 366/331; 366/343
[58] Field of Search ............... 366/129, 130, 279, 331, 366/343, 342; 15/344, 167 R

[56] References Cited

U.S. PATENT DOCUMENTS

| 2,805,050 | 9/1957 | Choppinet | 366/129 X |
| 3,299,924 | 1/1967 | Hanschitz | 366/279 X |
| 3,333,830 | 8/1967 | Spingler | |
| 3,407,431 | 10/1968 | Melnik | 15/344 |
| 3,619,754 | 11/1971 | Fuchs | 366/331 X |
| 3,890,984 | 6/1984 | Lesetar | 15/344 |

FOREIGN PATENT DOCUMENTS 2062516 8/1973 Fed. Rep. of Germany.
2429056 1/1975 Fed. Rep. of Germany.
2933886 3/1980 Fed. Rep. of Germany.

Primary Examiner—Frankie L. Stinson

[57] ABSTRACT

A mixing device (2) provided with a motor (12) received in a work portion (3) for driving a mixer rod (7) is adapted to be assembled without the need for screw-threaded connections and adhesives. For this purpose, the individual components (12, 19, 24, 4, 60, 70) are so relatively arranged and equipped with noses and projections for interengagement or latching that, after all components are fitted together, a completely assembled mixing device (2) is obtained which is totally enclosed in its outer circumferential contour.

17 Claims, 4 Drawing Sheets

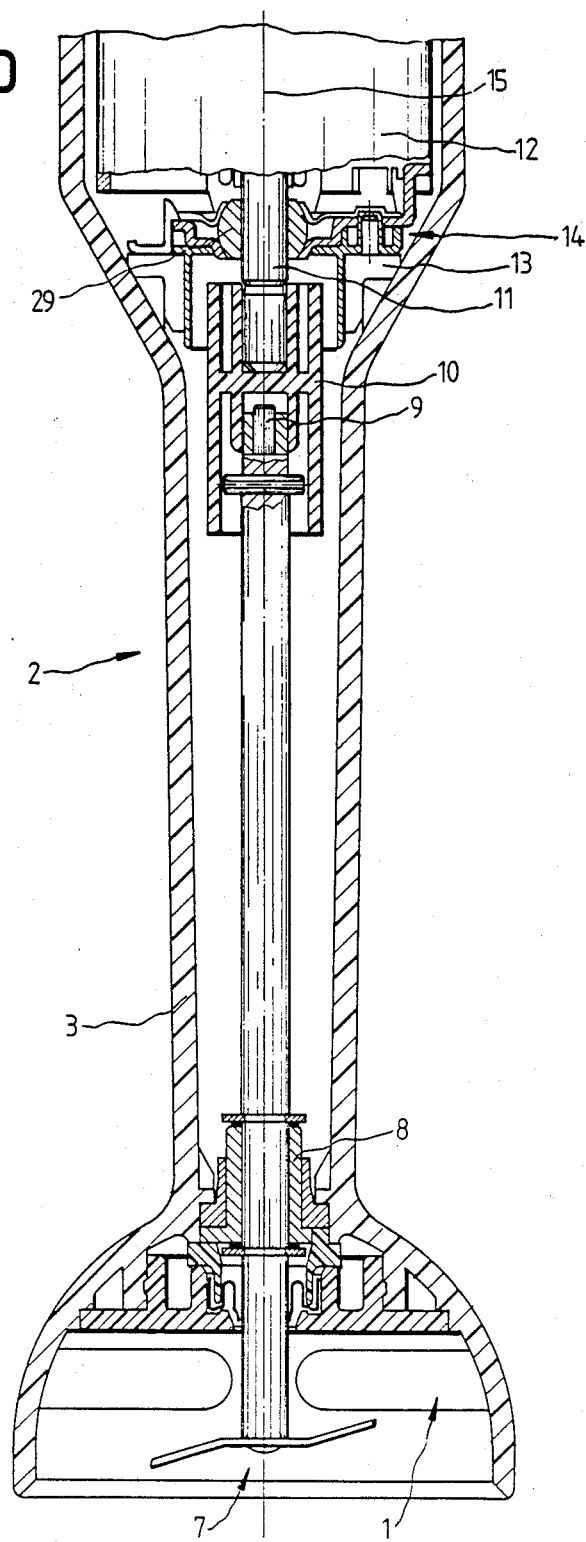

HAND-HELD MIXING DEVICE

This invention relates to a hand-held household appliance, in particular an immersion mixer, with a motor received in a work portion of the appliance, adapted to be supported in a bearing structure and serving to drive a tool, and with a handle portion adapted to be rigidly secured to the work portion of the appliance and accommodating the electrical components and controls.

A plurality of hand-held mixing devices are already known which are comprised of a lower housing portion and one or several upper housing portions in which the individual electrical components as well as the bearing elements for the electric motor are received. Within the housing, the individual components are secured by screw elements. Further, also the housing portions are interconnected by the added provision of special connecting elements as, for example, screws. The assembly of such a device is very complex, expensive and time-consuming, because each single part has to be secured in the housing portion by special fastening elements.

By contrast, it is an object of the present invention to configure and arrange the housing portions of the device as well as the individual mechanical and electrical components such that they may be secured in the device housing without the need for additional fastening elements as, for example, screws or pins.

This requirement is satisfied by the invention by providing the bearing structure, the mechanical and electrical components and controls of the motor, the work portion, the handle portion and the parts complementing the handle portion each with engaging and/or locking means which, after the individual parts are assembled in successive sequence, are each adapted to be securely interconnected with the work portion or with the previously assembled part. With this arrangement, the bearing structure is fixedly mounted in the work portion by engaging with an arm formed thereon into an opening of the work portion at its one end, while at its opposite end it is located in position by an arm engaging a flange formed on the handle portion, said flange in turn engaging with a nose into an opening in the work portion, and by providing for engagement of the handle portion with the bearing structure by an axial guideway disposed opposite the flange and the arm. For one thing, this arrangement of the invention locates the motor centrally in the work portion by means of the bearing structure, and for another thing, the handle portion takes support on the bearing structure, urging it against the motor as a result of the locking engagement in the work portion. Accordingly, the bearing structure and the handle portion provide a fixed connecting relationship only in combination with the work portion.

Advantageously, the bearing structure is additionally secured to the handle portion in axial direction in at least one place by means of at least one snap connection. This provides, in addition to the positive connecting relationship between the work portion and the handle portion, for further axial securing and centering of the handle portion relative to the work portion through the bearing structure. Thus, the need to provide screw connections, pins, bolts or similar fastening means is completely obviated since the engaging and guiding means fixedly disposed on the individual components serve to secure and position these components in their locations in the work portion. This unique push-lock system allows particularly quick assembly of the hand mixer. Disassembly of the appliance may only be performed by qualified staff since only they have the necessary knowledge about where to start first with the disassembly.

At the same time, the bearing member is additionally secured to the handle portion in axial direction in at least one place by means of at least one snap connection. Because many conventional screw connections become unnecessary, assembly of the appliance is possible within a minimum of time, resulting in a substantial cost reduction as compared to known assembly methods.

Advantageously, the individual engaging means on the components to be assembled are so configured that one component each is disengageably connected with the adjacent component or the component fitted in a subsequent or preceding operation via one or several engaging means. The individual engaging means may be configured as hooks, projections or noses engaging into suitable recesses provided in the work portion. To be able to disassemble the individual components or housing portions, the engaging means are configured such as to be slidable out of their locked positions, thus providing for disconnection of the individual components should the need arise. Advantageously, the motor has its driven end axially slidably received in the work portion via a resilient bearing, while its other end takes support upon the bearing structure and is resiliently secured in tension in the work portion and the handle portion by engaging and/or locking means provided on the bearing structure and by engaging and/or locking means formed on the handle portion. In this arrangement, the components are axially shifted until the respective engaging means have snapped into place. As a result of the resilient mounting of the motor, the engaging means are wedged in position so that only by pressing the bearing structure down against the rubber bearing can the engaging means be disengaged from the positions in which they secure the individual components. The work portion, the handle portion, the bearing structure, the cover and the rocker control being made of plastics material, it poses no problems forming such engaging or locking means integral with these parts. Increased complexity and increased cost of manufacturing the individual components are not involved.

It is an advantage that the bearing structure has at its section adjacent to the motor a cup-shaped receptacle which locates the motor centrally and has a radially outwardly extending arm providing a locking means held in its mounting position against the force of the resilient bearing by a projection provided on the handle portion, that the radially outer end of the arm abuts the inner wall of the work portion for centering the bearing structure, and that an arm configured as an engaging means and provided on the bearing structure at the end opposite the receptacle is lockingly engageable in an opening provided in the work portion. The arms or projections formed on the bearing structure fixedly secure and center the bearing structure by means of the handle portion in position in the work portion, whereby the motor is likewise centered in its final position. The arm has a groove open towards the upper end of the device, said groove serving to receive the front edge bounding the opening.

For the purpose of receiving, centering and securing the motor, the rocker control and the printed circuit board, the bearing structure includes a supporting plate from whose side close to the motor the cup-shaped receptacle extends, while on the supporting plate side remote from the motor two spaced upright wall parts are arranged having slotted openings for insertion of the printed circuit board therebetween. At the same time, the wall parts have their upper ends interconnected by a yoke, so that the yoke, in combination with the walls and the plate, accommodates and secures the rocker control, being at the same time inherently stable.

Contact between the printed circuit board and the electrical leads of the motor is established in a particularly simple manner by providing the printed circuit board with two contact lugs which are insertable together with the printed circuit board down into slotted openings provided in the motor for current supply. After the printed circuit board is secured in position in the bearing structure and in the motor, the lower work portion may be completed to an enclosed housing by insertion of the handle portion. To this end, the handle portion includes for insertion into the work portion a slotted guide provided on the peripheral rim of the opening, which guide is adapted to be pushed on the front edges of the corresponding opening of the work portion such that a nearly closed circumferential surface is obtained between the device housing and the handle portion.

To permit accurate alignment of the handle portion relative to the lower work portion, the handle portion includes a dovetail guide extending approximately parallel to the longitudinal axis of the device and adapted to be slid on a dovetail disposed on the bearing structure. This holds the handle portion fixed to the work portion in the lower area and to the bearing structure radially in the upper area. For assembly, therefore, the handle portion shifts the bearing structure against the bearing force a small amount downwardly which is made possible due to the resilience of the bearing structure, until the nose of the handle portion is allowed to lock into the recess in the work portion. In the process, the laterally protruding arm of the bearing structure abuts the underside of the nose of the handle portion, fixing it additionally in radially outward direction.

To provide a simple means for receiving and securing the power cord, in an improvement of the invention the handle portion has in an opening at its end remote from the motor a clearance in the form of a labyrinth which serves to receive and fasten the motor-side end of a power cord. In this arrangement, the cord is run to the outside through a bore provided on the side of the handle portion.

Following assembly of the handle portion, a cover may be inserted into the upper circular opening of the handle portion, said cover advantageously having for this purpose two opposed hooks on its underside, with the hooks being adapted to be introduced between the wall parts of the bearing structure and the wall parts of the cord housing forming the labyrinth until the hooks are in locking engagement with the underside of the bottom connecting the wall parts, while at the same time the extensions on the cover are laterally guided through the wall parts which abut the hooks outwardly and inwardly, respectively. As the cover is fitted into the opening in the handle portion, the ends of the extensions provides with the hooks urge the projections on the bearing structure radially outwardly until they cooperate with the projections provided on the handle portion in such a manner that the handle portion is no longer upwardly removable. This provides a simple means of fixedly mounting the cover on the handle portion without the need for a screw element.

Finally, the rocker switch may be pivotally mounted on the wall part of the work portion. Advantageously, a further opening for receiving a rocker control is provided in the bearing structure opposite the handle portion and/or in the work portion, which rocker control is pivoted to the bearing structure by means of two opposite pivot pins carried in bores, with a nose rearwardly engaging the rear wall of the labyrinth being provided on the end of the rocker control opposite the pivot pins, said nose limiting the outward rotational movement of the rocker control. It is to be understood that the pivot pins may also be provided on the rocker control and the bores in the bearing structure. Following mounting of the rocker control, all parts are secured in their positions in the device without the need to provide screw threaded connections.

Disassembly of the hand-held mixing device is only possible if first the rocker control is removed and then the cover is taken off in upward direction by expanding the hooks. All other parts may be subsequently dismounted as described above, yet in reverse order. An embodiment of the invention will be explained in more detail in the following with reference to the accompanying drawings. In the drawings, FIGS. 1a and 1b are longitudinal sectional views of a mixing device constructed in accordance with the invention, the cutting or mixing tool thereof being driven by an electric motor, with FIG. 1a showing the upper part and FIG. 1b the lower part of the mixing device;

FIG. 3 is a sectional view of the upper part of the device, taken on the line III—III of FIG. 1a.

Figure 1A:
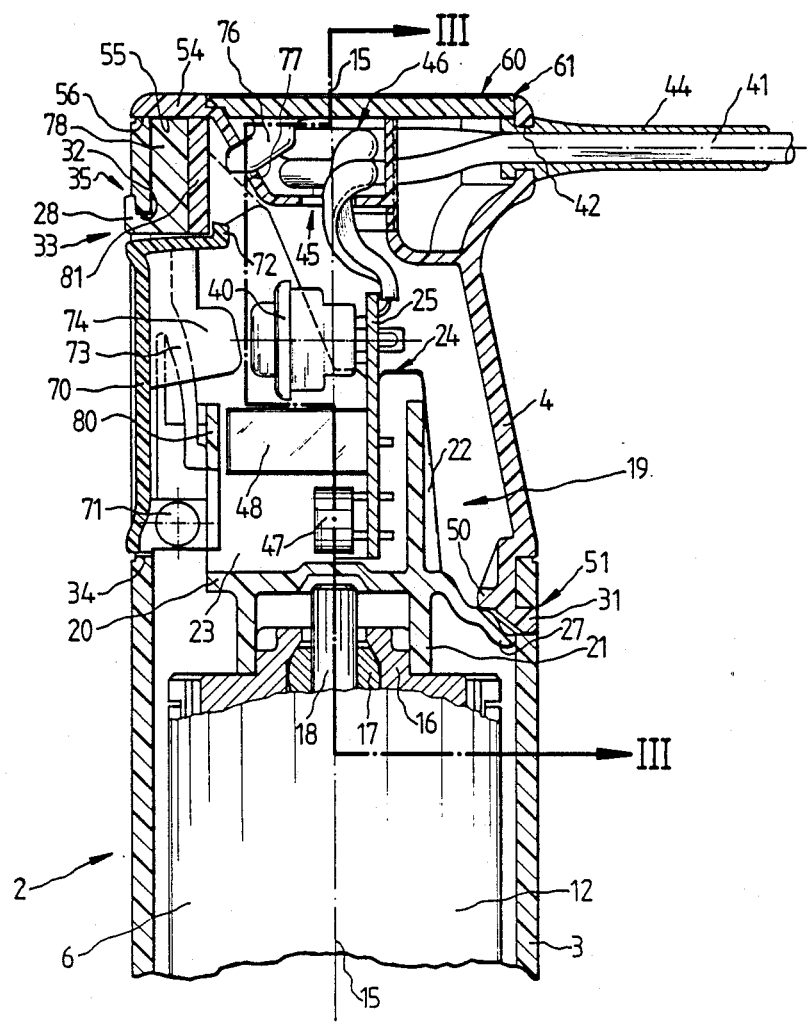

In the drawings, FIGS. 1a and 1b illustrate a mixing device 2 along the longitudinal axis 15, comprising a rod-shaped lower work portion 3 (FIG. 1b) and an upper handle portion 4 (FIG. 1a) adapted to be fitted into a recess 5 (FIG. 2) provided on the work portion 3. As becomes apparent from FIG. 1b, the work portion 3 is hollow in its lower section and tapers downwardly, with a rotary mixer rod 7 being provided in the lower part of the work portion 3 in a downwardly open and widening clearance 1 of bell shape, said mixer rod being for this purpose carried in a slide bearing 8 in the lower area. The upper end 9 of the mixer rod is in driving connection with a shaft 11 of a motor 12 received in the work portion 3 via a coupling means 10. The lower bearing end 14 of the motor is carried in an axially elastically deformable bearing 13.

Figure 2:
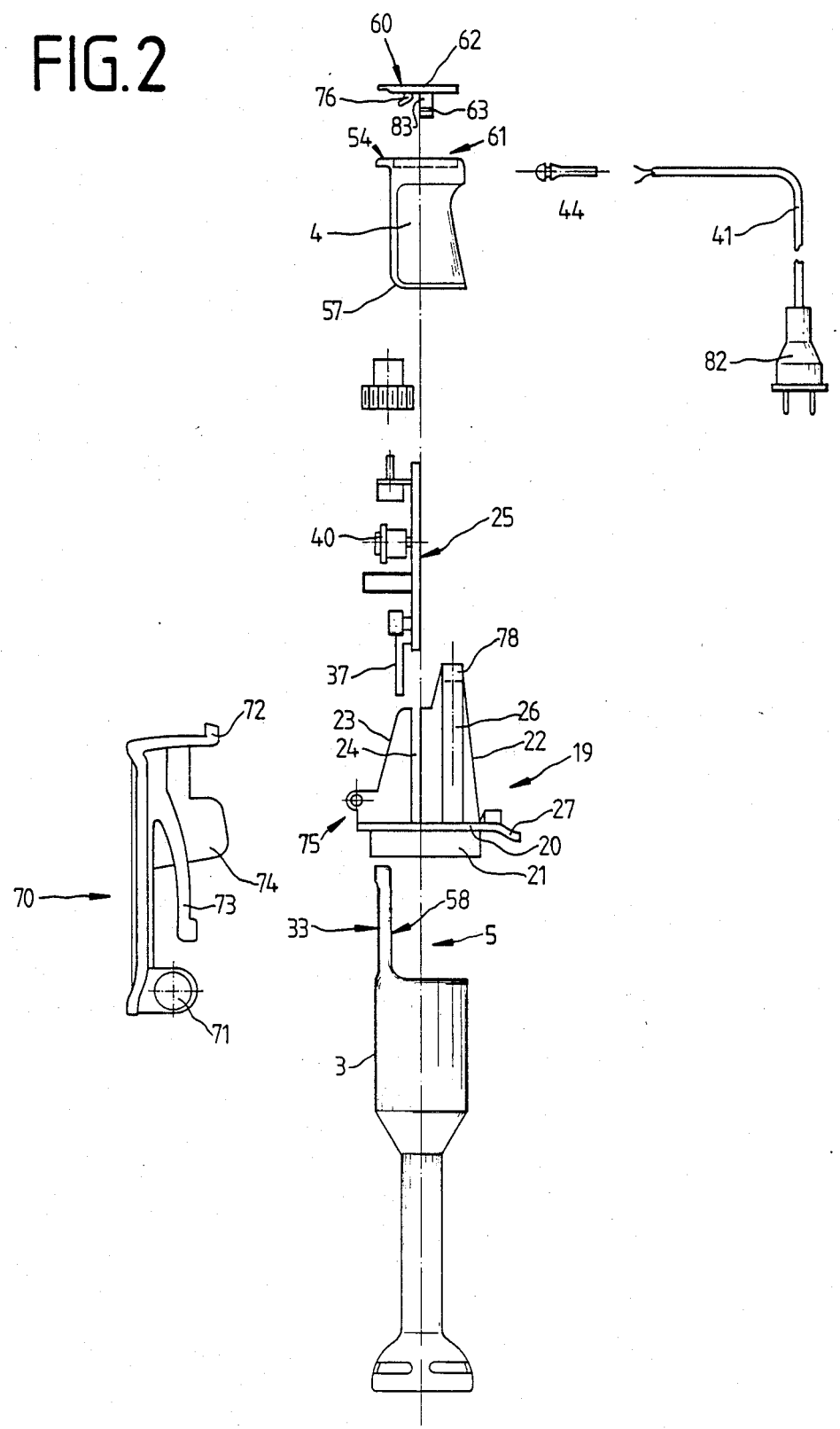
FIG. 2 is an exploded side view of the individual electrical and mechanical components of the mixing device.
Figure 3:
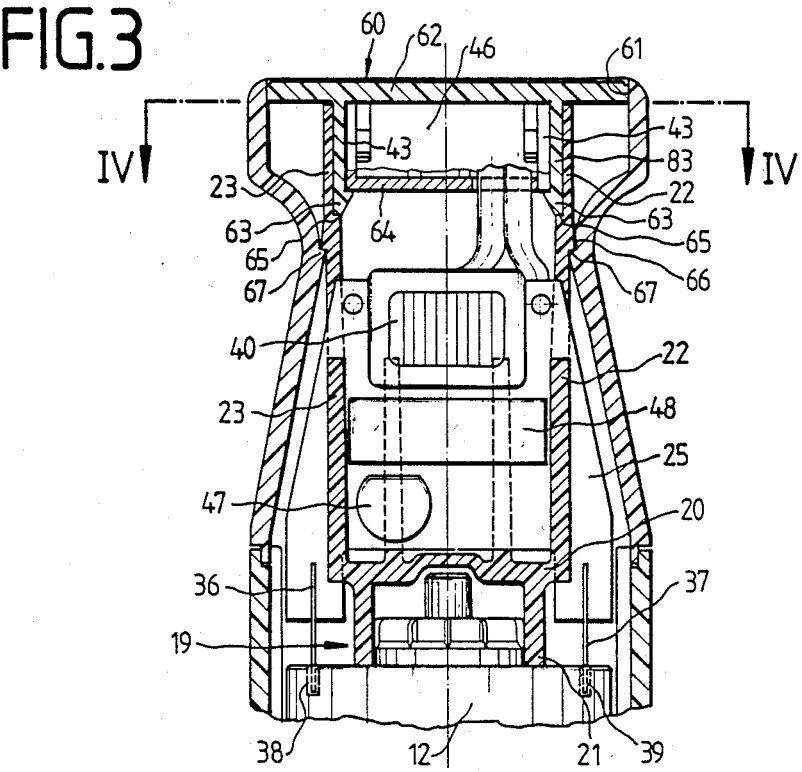

Referring to FIG. 1a of the drawings, the upper end of the motor 12 has a cylindrical shoulder 16 which is connected with the casing 6 of the motor 12 and serves to receive a slide bearing 17 in which the shaft 18 of the rotor, not shown in further detail, is rotatably carried. Also, a further slide bearing 29 for centering and carrying the rotor is provided on the lower bearing end 14. Seated on the outer periphery of the cylindrical shoulder 16 is the bearing structure 19 which, as best shown in FIGS. 1a, 2 and 3, is comprised of a supporting plate 20 having a cup-shaped receptacle 21 on its underside and relatively spaced wall parts 22, 23 on its upper side which have their upper ends interconnected by a yoke 78, with the wall parts 22, 23 forming a slotted opening 24 (FIG. 2) for receiving a printed circuit board 25. The right-hand wall part 22 has brackets 26 providing for additional connection with the supporting plate 20. The bearing structure 19 has its cup-shaped receptacle seated on the cylindrical shoulder 16 of the motor 12. For locating the supporting plate 20 laterally and axially, it is equipped with an arm 27 (FIGS. 1a and 2) abutting the underside of a nose 31 provided on the handle portion 4–as will be described in the following.

At the upper end of the wall part 23, the bearing structure 19 has a further arm 28 (FIG. 1a) which rearwardly engages the lower front edge 32 of the work portion 3 if to this end the bearing structure 19 is slightly urged downwards against the resilient bearing 13 (FIG. 1b) and if in the process the arm 28 with its groove 35 is passed through the opening 33 provided in the work portion 3. The motor 12 is thereby fixedly held under bias in both radial and axial direction by means of the bearing structure 19, while in the lower area the bearing structure 19 and the motor 12 tend to swing away to the right as a result of the absence of a downwardly directed force to be produced later by the flange 50 acting on the arm 27 (FIG. 1a).

Figure 4:
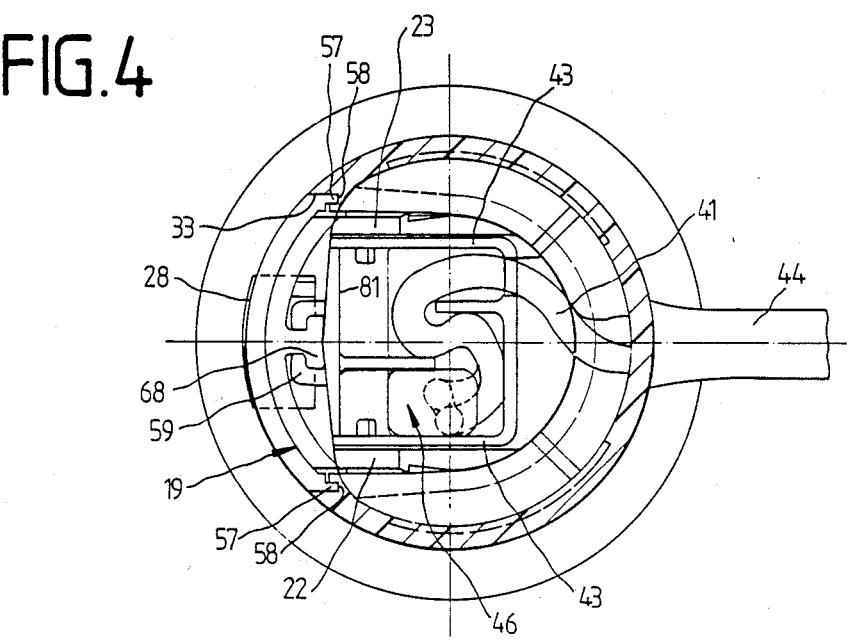
FIG. 4 is a sectional view of the upper part of the device, taken on the line IV—IV of FIG. 3.

After the bearing structure 19 is installed, the printed circuit board 25 may be inserted into the slotted opening 24 from above (see FIGS. 2 and 3). The printed circuit board 25 has at its lower end two relatively spaced contact lugs 36 and 37 which are introduced into slotted openings 38 and 39 at the upper end of the motor 12 (FIG. 3) as the printed circuit board 25 is inserted in the slot 24. Via the two contact lugs 36 and 37, current is supplied to the motor 12. Electrical conductors not shown in the drawings connect the contact lugs 36 and 37 to a switching device 40 provided on the printed circuit board 25 and supplied with power through a power cord 41 and a plug 82 fastened to the cord end. Where the cord 41 exits the device 2, an armor 44 is provided which is fixedly received in a circular clearance 42 of the handle portion 4. The power cord 41 is further received in a labyrinth 46 (FIG. 4) having on its lower side a bore 45 through which the cord 41 is run down to the printed circuit board 25. As becomes apparent from FIG. 4, the cord 41 is secured in the handle portion 4 by means of the labyrinth 46. Mounted on the printed circuit board 25 are further a diode 47, a capacitor 48 as well as further electronic components not shown in greater detail for controlling the motor 12.

After the printed circuit board 25 is located in position in the slotted opening 24 of the bearing structure 19 and in the slotted openings 38, 39 of the motor 12, the handle portion 4 may be assembled with the bearing structure 19 and with the work portion 3. As the handle portion 4 is introduced in the recess 5 of the work portion, first the dovetail guide 59 is threaded into the dovetail 68, so that the dovetail guide 59 will slide inside and along the dovetail 68 when the handle portion 4 is subsequently pressed down. To ensure abutment of the nose 31 with the inner wall of the work portion 3 before the handle portion 4 is pressed down, the wall area of the handle portion 4 has to be elastically deformed or bent radially inwardly in the area of the nose 31. In accordance with FIG. 1a, on pressing down the bearing structure 19, the lower flange 50 is then urged against the arm 27 until the lower nose 31 of the handle portion 4 resiliently outwardly locks into the opening 51 provided in the work portion 3. In the process, the motor 12 is again slightly displaced downwardly through the bearing 14 against the resilient bearing 13. As soon as the lower nose 31 has locked into the opening 51, the upper flange portion 54 which is connected with the labyrinth 46 is in snug engagement with the upper front edge 55 of the yoke 78 and the front edge 56 of the work portion 3. In this end position, the handle portion 4 is fixedly secured in both radial and axial position by the nose 31 and the dovetail guide means 59, 68. Because depression of the handle portion 4 causes locking engagement of the front edges 58 into the slotted guide 57, said edges bounding the rim of the recess 5 of the work portion, also the handle portion 4 is securely fixed to the work portion in the area of transition to the work portion.

Subsequently, the cover 60 may be fitted into the upper opening 61 of the handle portion 4. As becomes apparent from FIGS. 2 and 3, the cover 60 is comprised of a horizontally extending circular plate 62 having on its underside hooks 63 formed on two relatively spaced extensions 83. In the position shown in FIG. 3, the opposed hooks 63 engage the underside of the bottom 64 of the labyrinth 46, thereby securing the cover 60 to the device 2. At the same time, a further hook 76 provided on the bottom 64 of the cover 60 engages into an opening 77 provided on the labyrinth 46 for this purpose (FIG. 1a). The hook 76 ensures that the cover 60 assumes always the correct mounting position. At the same time, the hook 76 prevents vertical removal of the cover 60 in upward direction. As the cover 60 is pressed down, its downward displacement is stopped by the ends of the hooks 63 abutting the projections 65 provided in the wall parts 22, 23 of the bearing structure 19. Fitting the cover 60 further causes the wall parts 22, 23 to be urged radially outwardly until the projections 66 of the bearing structure 19 engage with the projections 67 of the handle portion 4. This provides an additional securing means for the handle portion 4 in upward direction. The wall parts 43 on the labyrinth 46 and the extension 83 on the cover 60 keep the wall parts 22, 23 accurately relatively spaced so that the projections 66, 67 will always interengage. Thereby additional axial securing of the handle portion 4 is always maintained.

As shown in FIG. 1a, the opening 33 for receiving the rocker control 70 is further bounded by a lower front edge 34.

As a final operation, the rocker control 70 may be mounted in the opening 33 provided in the work portion 3. To this end, first the upper part of the rocker control is introduced into the opening 33 until the nose 72 rearwardly engages the rear wall 81, as shown in FIG. 1a. The wall parts 22, 23 of the bearing structure 19 are then flexed towards each other until the pivot pins 75 formed on the wall parts 22, 23 slide into the opening 33 and lock into the bores 71 provided on the rocker control 70. In this position shown in FIG. 1a, the rocker control 70 is located in position, so that actuation of the rocker control 70, that is, its pivoting movement about the pivot pins 75, causes the cam 74 to abut the switching device 40. The spring 73 formed on the rocker control 70 bears resiliently against the wall part 80 of the bearing structure 19, causing the rocker control 70 to automatically pivot back into its initial position shown in FIG. 1a, that is, until abutment of the nose 72 upon the rear wall 81.

From the foregoing it results that all components of the mixing device 2 are secured in their relative positions by locking means, hooks or projections, thereby eliminating the need for additional connecting elements such as screws, nuts, adhesives, etc. Advantageously, the components mounted in the mixing device 2 are each operatively interconnected such as to mutually secure themselves, thus locating the individual components in their positions in the work portion 3. This makes the hand-held mixing device 2 substantially less expensive and simplifies the assembly. Such a simple construction is particularly well suited to high-speed assembly on the assembly line.

Disassembly of the individual components is in the reverse order. First, a flat tool is inserted in the slot between the rocker control 70 and the rim of the opening 33 to urge the pivot pins 75 of the rocker control 70 apart until the bores 71 disengage from the pivot pins 75, enabling the rocker control 70 to be removed from the opening 33 in downward direction.

The opening 33 which is thus exposed then permits access to the two hooks 63 of the cover 60. The hooks 63 are slightly bent outwardly until they become disengaged engaged from the bottom 64, enabling the cover 60 to be withdrawn from the opening 61 in upward direction, in which process the hooks 63 slide along the outside of the wall parts 43 of the labyrinth 46. Following removal of the cover 60, the right-hand side wall of the handle portion 4 is pressed inwardly in the area of the nose 31, causing the nose 31 to slide out of the opening 51 and enabling the handle portion 4 to be pulled from the dovetail 68 in upward direction. As the handle portion 4 is removed, the printed circuit board 25 which is connected to the handle portion 4 through the cord 41 is pulled out from the slotted guide 57 simultaneously. This operation is followed by pushing down on the arm 28 of the bearing member 19 and shifting it to the right through the opening 33 of the handle portion 4, so that the bearing structure 19 may be withdrawn in upward direction. Finally, the motor 12 may be lifted up and out of the work portion 3, since the coupling means 10 is centered on the rotor shaft 11 with axial clearance.

I claim:

1. A hand-held household appliance, such as an immersion mixer, comprising a work portion having first and second engaging portions, bearing structure including a latch portion for engagement with said first engaging portion of said work, a motor received in said work portion, said motor being supported in said bearing structure when said bearing structure latch portion is in engagement with said first engaging portion of said work portion, and a handle portion including an engagement portion for engagement with said second engaging portion of said work portion for rigid securing of said handle portion to said work portion, said handle portion accommodating control components of said motor such that said work portion, said bearing structure, said control components, and said handle portion can be assembled in a particular successive sequence after which they are securely interconnected, and can then be disassembled only in reverse order of said particular successive sequence.

2. A hand-held household appliance, in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said bearing structure having two arm portions and said handle portion having a flange and a nose, said bearing structure and said handle portion being fixedly secured to said work portion by having one of said arm portions of said bearing structure engage into an opening of said work portion and another of said arm portions engaging said flange formed on said handle portion and said nose of said handle portion engaging into an opening in said work portion, and said handle portion being engaged with said bearing structure by an axial guideway disposed opposite said flange and said another arm portion.

3. A device as claimed in claimed in claim 2 wherein said bearing structure is additionally secured to said handle portion in axial direction in at least one place by means of at least one snap connection.

4. A hand-held household appliance, in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said motor having its driven end axially slidably received in said work portion via a resilient bearing, and its other end supported on said bearing structure and secured in said work portion by engaging means on said bearing structure and by engaging means on said handle portion.

5. A device as claimed in claim 4 wherein said handle portion has a projection, said bearing structure has at its section adjacent said motor a cup-shaped receptacle which locates said motor centrally and has a radially outwardly extending arm providing a locking means held in its mounting position against the force of said resilient bearing by said projection provided on said handle portion, the radially outer end of said arm abuts the inner wall of said work portion for centering said bearing structure, and an arm provided on said bearing structure at the end opposite said receptacle is lockingly engageable in an opening in said work portion.

6. A device as claimed in claim 5 wherein said arm has a groove open towards the upper end of the device, said groove serving to receive the front edge bounding an opening in said work portion.

7. A device as claimed in claim 4 wherein said bearing structure includes a cup-shaped receptacle which locates said motor centrally and a supporting plate from whose side close to said motor said cup-shaped receptacle extends, that on its side remote from said motor two spaced upright wall parts are arranged slotted openings for insertion of a printed circuit board therebetween, said board serving to accommodate electrical components, and said wall parts have their upper ends interconnected by a yoke so that said yoke, in combination with said walls and said supporting plate, provides an opening for receiving a rocker control.

8. A device as claimed in claim 7 wherein said printed circuit board is provided with two contact lugs which are insertable together with said printed circuit board down into slotted openings provided in said motor for current supply.

9. A hand-held household appliance, in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said work portion having an opening and being adapted to be completed to a device housing by said handle portion, said handle portion including for insertion into said work portion a slotted guide provided on the peripheral rim of said opening, said guide being adapted to be pushed on the front edges of said opening of said work portion such that a nearly closed circumferential surface is obtained between the device housing and said handle portion.

10. A hand-held household appliance in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said bearing structure including a dovetail and said handle portion including a dovetail guide extending approximately parallel to the longitudinal axis of the device and adapted to be slid on said dovetail on said bearing structure.

11. A device as claimed in claim 10 wherein said handle portion has structure at its end remote from said motor in the form of a labyrinth which serves to receive and fasten the motor-side end of a power cord.

12. A device as claimed in claimed 11, characterized in that the cord is run to the outside through a bore provided on the side of the handle portion.

13. A hand-held household appliance, in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said handle portion having opening structure and cord receiving structure at its end remote from said motor which serves to receive and fasten the motor-side end of a power cord, and a cover having hook extensions on its underside is adapted to be into said opening structure, with said hook extensions being adapted to be introduced between said bearing structure and said cord receiving structure until said hook extensions are in locking engagement with the underside of said cord receiving structure and at the same time said hook extensions on the cover are laterally guided through wall parts of said bearing structure and said cord receiving structure.

14. A device as claimed in claim 13 wherein said bearing structure and said handle portion each include projections, and said cover on insertion in said opening structure of said handle portion, the ends of said extensions provided with said hooks urge said projections on said bearing structure radially outwardly until they cooperate with said projections on said handle portion in such a manner that said handle portion is no longer upwardly removable.

15. A hand-held household appliance, in particular an immersion mixer, comprising a work portion, bearing structure, a motor received in said work portion adapted to be supported in said bearing structure and serving to drive a tool, a handle portion adapted to be rigidly secured to said work portion, and control components of said motor, said bearing structure, said work portion and said handle portion each being provided with engaging means which, as individual parts are assembled in successive sequence, are each adapted to be securely interconnected with said work portion or with a part assembled in a prior or subsequent operation, said work portion including opening structure opposite said handle portion, and a rocker control disposed in said opening structure, said rocker control being pivoted to said bearing structure by means of pivot pin structure, and a nose on the end of said rocker control opposite said pivot pin structure said nose limiting the rotational movement of said rocker control in outward direction.

16. A device as claimed in claimed 15, wherein said rocker control further includes spring structure that bears against a wall part of said bearing structure and resiliently urges said rocker control in said outward direction.

17. A device as claimed in claim 16, wherein said rocker control is made of plastics material and said spring structure is comprised of two spring arms integrally formed on said rocker control.

* * * * *

UNITED STATES PATENT AND TRADEMARK OFFICE
CERTIFICATE OF CORRECTION

PATENT NO. : 4,850,699
DATED : July 25, 1989
INVENTOR(S) : Antonio Rebordosa

It is certified that error appears in the above-identified patent and that said Letters Patent is hereby corrected as shown below:

Col. 3, line 62, "provides" should be --provided--.

Col. 7, line 17, delete "engaged".

Claim 1, col.7, line 41, after "work" (first occurrence) insert --portion--.

Claim 3, col. 8, line 16, delete "claimed in".

Claim 12, col. 9, line 53, change "claimed" (second occurrence) to --claim--.

Claim 16, col. 10, line 53, change "claimed" (second occurrence) to --claim --.

Signed and Sealed this

Eighteenth Day of September, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,850,699

DATED : July 25, 1989

INVENTOR(S) : Antonio Rebordosa

It is certified that error appears in the above-identified patent and that said Letters Patent is hereby corrected as shown below:

Claim 13, col. 10, line 12, after "be" insert --inserted--.
Claim 13, col. 10, line 18, after "structure" insert a comma.
Claim 13, col. 10, line 19, delete "on the cover".
Claim 15, col. 10, line 50, after "structure" insert a comma.
Claim 16, col. 10, line 53, delete the comma.
Claim 17, col. 10, line 58, delete the comma.

Signed and Sealed this

Fifth Day of February, 1991

Attest:

HARRY F. MANBECK, JR.

Attesting Officer     Commissioner of Patents and Trademarks